United States Patent [19]

Fuchida

[11] Patent Number: 5,320,498
[45] Date of Patent: Jun. 14, 1994

[54] STRUCTURE FOR PLUNGER PUMP

[75] Inventor: Takeshi Fuchida, Atsugi, Japan

[73] Assignee: Unisia Jecs Corporation, Japan

[21] Appl. No.: 13,830

[22] Filed: Feb. 3, 1993

[30] Foreign Application Priority Data

Feb. 10, 1992 [JP] Japan .................. 4-004735[U]

[51] Int. Cl.$^5$ ............................................. F04B 49/00
[52] U.S. Cl. .................... 417/214; 417/554; 92/23
[58] Field of Search .............. 417/214, 554; 92/13, 92/13.5, 23

[56] References Cited

U.S. PATENT DOCUMENTS

| 2,936,712 | 5/1960 | Gerpen | 92/13 |
| 4,014,414 | 3/1977 | Yamamoto et al. | 92/23 |
| 4,970,943 | 11/1990 | Saig et al. | 92/13.5 |
| 5,067,881 | 11/1991 | Maehara | 417/554 |
| 5,090,295 | 2/1992 | Cunningham et al. | 417/214 |

FOREIGN PATENT DOCUMENTS 2836243  3/1979  Fed. Rep. of Germany .......... 92/23
2-286883 11/1990 Japan.

Primary Examiner—Richard A. Bertsch
Assistant Examiner—Peter Korytnyk
Attorney, Agent, or Firm—Lowe, Price, LeBlanc & Becker

[57] ABSTRACT

A support structure for a plunger employed in a plunger pump, comprises a pump housing, a cylinder firmly fitted into a cylindrical hollow defined in said housing, a plunger slidably enclosed in the cylinder to provide a pumping action, a stopper arranged on an inner peripheral surface of the cylinder, and an engaging portion arranged on the outer peripheral surface of the plunger, for engaging with the stopper and for restricting an axially projecting amount of the plunger relative to the cylinder.

5 Claims, 2 Drawing Sheets

STRUCTURE FOR PLUNGER PUMP

BACKGROUND OF THE INVENTION

1. Field of the Invention

The present invention relates to a structure for a plunger pump which can be optimally applied for an anti-skid brake control system for an automotive vehicle, and specifically to a support structure for a plunger operably employed in a plunger pump.

2. Description of the Prior Disclosure

Recently, there have been proposed and developed various automotive brake control systems associated with at least one of advantageous braking force control systems, namely a traction control system generally abbreviated as a TCS which is provided for suppressing excessive driving force exerted on driven wheels during quick depressing operation of an automotive accelerator pedal, such as quick starting, quick acceleration, or the like, and an anti-skid brake control system generally abbreviated as an ABS which is provided for preventing brakes from locking vehicle wheels during quick braking or during braking on a low frictional road surface so as to provide maximum effective braking. Of these braking force control systems, the ABS generally includes at least one brake fluid reservoir associated with either the front-wheel side or the rear-wheel side for temporarily storing the brake fluid returned from the wheel cylinders, and an auxiliary pump unit arranged for supplying the brake fluid in the wheel cylinders to the brake fluid reservoir so as to reduce the wheel cylinder pressure during the anti-skid brake control. The ABS also includes a pressure intensifying valve and a pressure reducing valve both connected to the associated wheel cylinder. The pressure intensifying valve is provided between the outlet port of the master cylinder and the inlet port of the wheel cylinder so as to establish or block the brake fluid flow from the master cylinder to the wheel cylinder, while the pressure reducing valve is provided between the brake fluid reservoir and the wheel cylinder so as to return the brake fluid in the wheel cylinder through the brake fluid reservoir and the ABS pump to the master cylinder. The ABS is operated so that the wheel slippage can be maintained within a predetermined slippage criterion by reducing, holding, and increasing the wheel cylinder pressure in response to the road condition. Traditionally, the pressure intensifying valve and the pressure reducing valve are each comprised of a two-position electromagnetic solenoid valve. Alternatively, the pressure intensifying valve and the pressure reducing valve are both comprised of a single three-position solenoid valve. For instance, the pressure intensifying valve is closed and the pressure reducing valve is opened in order to control the wheel slippage within an acceptable slippage, when the wheel cylinder pressure is reduced during the anti-skid brake control. The auxiliary pump unit is usually referred to as an "ABS pump". One such ABS pump has been disclosed in Japanese Patent First Publication Tokkai Heisei No. 2-286883.

As shown in FIG. 4, the above-noted conventional ABS pump unit is comprised of a plunger pump. Referring now to FIG. 4, the plunger pump comprises a pump housing 1 defining a cylindrical hollow 2 therein, a cylinder 3 inserted and fixed into the cylindrical hollow 2, and a plunger 4 slidably enclosed in the cylinder 3. The pump housing 1 is integrally formed as the same housing as the pressure intensifying and reducing valve being comprised of a three-position solenoid valve, for example. As clearly seen in FIG. 4, the cylinder 3 has a radial opening 3a, while the plunger 4 is formed with a radial opening 4a and an axial bore 4b. The plunger pump includes a plunger biasing means, such as a coil spring 7 comprised of a compression spring, for normally biasing the plunger 4 to a drive cam 8. The plunger pump also includes a check valve means for regulating the outlet pressure of the plunger pump. The check valve means is comprised of an inlet check ball 6 and a coil spring 5 whose spring constant determines a setting pressure of the check valve means. Conventionally, the drive cam 8 is comprised of an eccentric cam having a driven connection with a direct current motor. The plunger pump is driven by virtue of the DC motor. During operation of the plunger pump, the brake fluid temporarily stored in the brake fluid reservoir is introduced through the radial openings 3a and 4a into the axial bore 4b. Thereafter, the brake fluid in the axial bore 4b is fed through the inlet check valve 6 and 5 to an outlet port of the plunger pump, in accordance with a reciprocating motion of the plunger 4.

As set forth above, since the plunger 4 of the prior art plunger pump is normally biased in a direction outwardly projecting from the interior of the cylinder 3 by means of the coil springs 7 and 5, when a sub-assembly being in a state wherein the plunger 4, the return spring 7 for the plunger, the inlet check ball 6, and the return spring 5 for the check ball 6 are all assembled in the cylinder 3, is inserted into the cylindrical hollow 2 of the housing, there is a tendency for the plunger 4 and the check ball 6 to fall out of the cylinder 3. Therefore, when assembling the sub-assembly with the housing, a working efficiency is lowered and consequently a manufacturing cost is increased. Due to the outwardly projecting plunger of the sub-assembly, a degree of freedom for assembling is limited. That is, although the sub-assembly can be upwardly assembled into the cylindrical hollow 2 of the housing 1 in its vertical direction, it is difficult to downwardly insert the sub-assembly into the cylindrical hollow 2 of the housing in a vertical direction or to horizontally insert the sub-assembly into the cylindrical hollow 2, because the plunger and the inlet check valve both tends to fall out of the cylindrical hollow of the pump housing.

SUMMARY OF THE INVENTION

It is therefore, in view of the above disadvantages, an object of the present invention to provide a support structure for a plunger employed in a plunger pump which can prevent the plunger from falling from a sub-assembly including the plunger and a cylinder operably receiving the plunger, when assembling the sub-assembly into a pump housing.

It is another object of the invention to provide a support structure for a plunger employed in a plunger pump in which a working efficiency is enhanced when assembling the plunger pump.

It is a further object of the invention to provide a support structure for a plunger employed in a plunger pump according to which a high degree of freedom for assembling is assured.

In order to accomplish the aforementioned and other objects, a support structure for a plunger employed in a plunger pump, comprises a pump housing, a cylinder firmly fitted into a cylindrical hollow defined in the housing, a plunger slidably enclosed in the cylinder to provide a pumping action, a stopper arranged on an inner peripheral surface of the cylinder, and an engaging portion arranged on the outer peripheral surface of the plunger, for engaging with the stopper and for restricting an axially projecting amount of the plunger relative to the cylinder.

According to another aspect of the invention, a support structure for a plunger employed in a plunger pump, comprises a pump housing, a cylinder firmly fitted into a cylindrical hollow defined in the housing, a plunger slidably enclosed in the cylinder to provide a pumping action, at least one stop pawl retractably arranged on an inner peripheral surface of the cylinder and normally biased in a central axis of the cylinder, the stop pawl being retracted only when the stop pawl is subjected to a force acting radially and outwardly of the cylinder, and a groove formed on the outer peripheral surface of the plunger and having a radially extending plane abutting with the stop pawl, for restricting an axially projecting amount of the plunger relative to the cylinder.

According to a further aspect of the invention a support structure for a plunger employed in a plunger pump, comprises a pump housing, a cylinder firmly fitted into a cylindrical hollow defined in the housing, a plunger slidably enclosed in the cylinder to provide a pumping action, and a C-shaped snap ring having a radially and inwardly projecting one pair of stop pawls at the opposing free ends thereof. The cylinder includes a first annular groove receiving the snap ring therein and a radial opening communicating the first annular groove with the interior of the cylinder. The radial opening permits the stop pawls to be projected into the interior of the cylinder when the snap ring is snapped into the first annular groove. The plunger includes a second annular groove on the outer peripheral surface thereof, for interlocking the cylinder and the plunger by engagement between the stop pawls and the second annular groove.

According to a still further aspect of the invention, a structure for a plunger pump comprises a pump housing, a cylinder firmly fitted into a cylindrical hollow defined in the housing and defining an internal space therein, a plunger slidably enclosed in the internal space of the cylinder to provide a pumping action, the plunger employing a fluid passage introducing a working fluid therethrough, a pressure chamber being defined by an innermost end of the plunger inserted into the cylinder and the internal space of the cylinder, the cylinder including an outlet port communicating with the pressure chamber, for discharging the working fluid pressurized in accordance with a retracting movement of the plunger, an inlet check valve arranged in the pressure chamber, for preventing back-flow from the first pressure chamber to the fluid passage of the plunger, an outlet check valve attached to one end of the cylinder, for preventing back-flow from the outlet port of the cylinder to the pressure chamber, and a C-shaped snap ring having a radially and inwardly projecting one pair of stop pawls at the opposing free ends thereof. The cylinder includes a first annular groove receiving the snap ring therein and a radial opening communicating the first annular groove with the interior of the cylinder. The radial opening permits the stop pawls to be projected into the interior of the cylinder when the snap ring is snapped into the first annular groove. The plunger includes a second annular groove on the outer peripheral surface thereof, for interlocking the cylinder and the plunger by engagement between the stop pawls and the second annular groove and for restricting both an axially projecting amount and an axially retracting amount of the plunger relative to the cylinder. The C-shaped snap ring employs an oil filter for filtering out impurities in the working fluid introduced into the plunger and the cylinder includes at least one radial opening introducing the working fluid passing through the filter into the fluid passage of the plunger.

DESCRIPTION OF THE PREFERRED EMBODIMENTS

Figure 1:
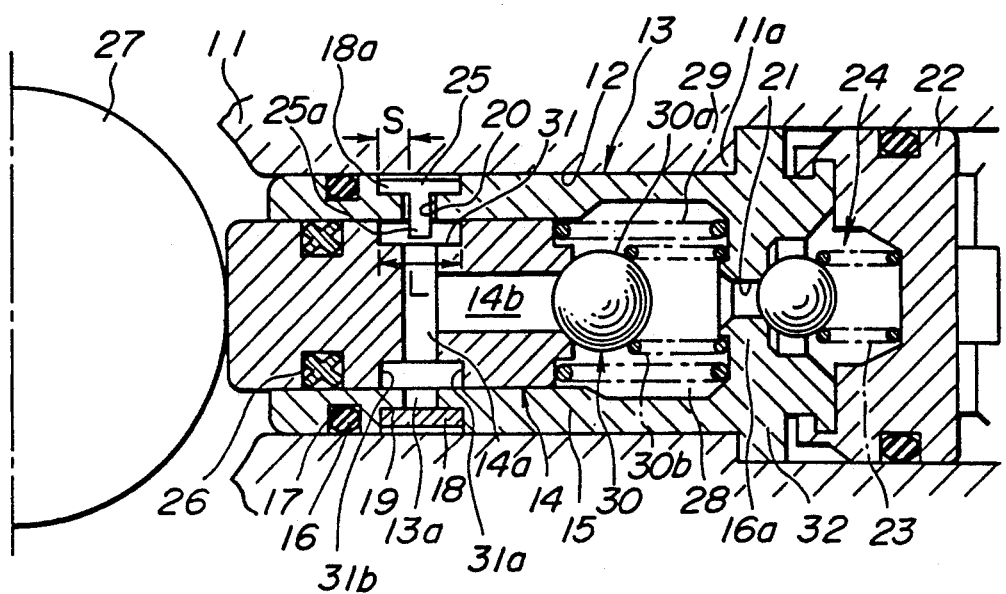
FIG. 1 is a longitudinal cross-sectional view illustrating a preferred embodiment of a plunger pump according to the invention.
Figure 2:
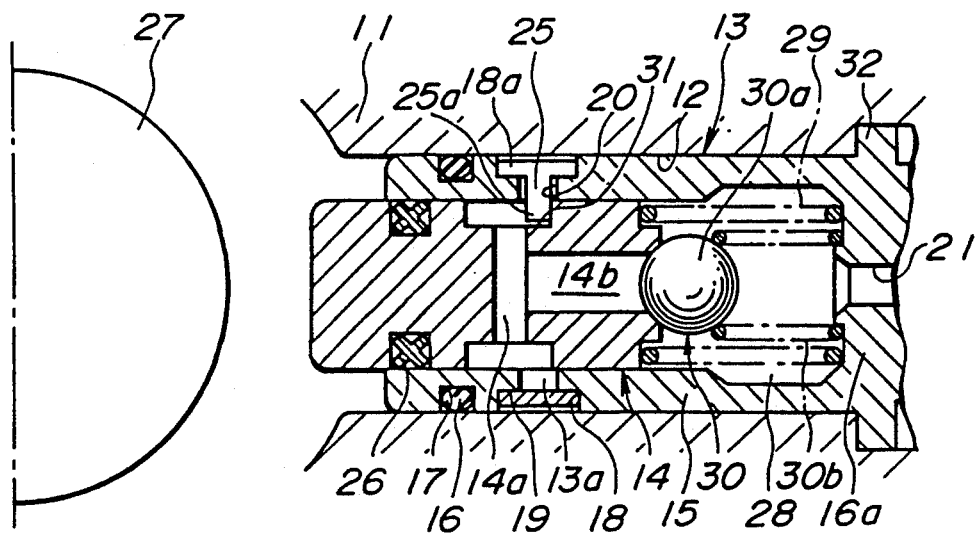
FIG. 2 is a longitudinal cross-sectional view illustrating an installing state of a sub-assembly of the plunger pump of the embodiment of FIG. 1.

Referring now to the drawings, particularly to FIGS. 1 and 2, there is shown a structure of a plunger pump of the preferred embodiment which can be preferably applied as an ABS pump. The plunger pump of the embodiment comprises a pump housing 11 which is applied commonly to a three-position solenoid valve serving as a pressure intensifying valve and a pressure reducing valve for an anti-skid brake control system for an automotive vehicle, and a plunger 14. The pump housing 11 defines a substantially cylindrical hollow 12 therein. The plunger pump includes a cylinder 13 inserted and fixed into the cylindrical hollow 12. As seen in FIG. 1, the plunger 14 is slidably enclosed in the cylinder 13. The cylinder 13 is comprised of a cylindrical portion 15 and a flange portion 32 restricting a maximum inserting amount of the cylinder 13 relative to the cylindrical hollow 12 and precisely positioning the cylinder 13 in the housing 11, by abutting the flange portion 32 with a shoulder portion 11a of the pump housing 11. As seen in FIG. 1, the cylindrical portion 15 and the flange portion 32 are integrally formed with each other. The cylinder 13 includes an annular groove 17 in the vicinity of the left end thereof, in such a manner as to assuringly seal an aperture defined between the inner peripheral surface of the cylindrical hollow 12 and the outer peripheral surface of the cylinder 13 by fitting a seal ring 16, such as an O ring, into the annular groove 17. The cylinder 13 includes a substantially annular support groove 19 receiving a C-shaped snap ring member 18 having a filtering portion filtering out impurities included in the brake fluid supplied to the inlet port of the plunger pump through a brake fluid reservoir (not shown) which is provided in an anti-skid brake control system to temporarily store the brake fluid returned via a pressure reducing valve employed in the ABS. The cylinder 13 also includes a plurality of radial openings 13a and 20 connecting to the annular support groove 19 and exposing to the inner space defined in the cylindrical portion 15 of the cylinder 13. These openings are hereinbelow described in detail. A radially extending right end portion 16a (viewing FIG. 1) integrally formed with the flange portion 32 of the cylinder 13 includes an axially bored discharge outlet 21 at its center. Reference numeral 22 is a plug provided for firmly securing the cylinder 13 in a predetermined maximum inserting position of the cylinder 13 with respect to the cylindrical hollow 12 by virtue of the flange 32.

The plunger 14 is substantially cylindrical and employing a sealing member 26 in the vicinity of the left end thereof, for sealing an aperture defined between the outer peripheral surface of the plunger 14 and the inner peripheral surface of the cylinder 13 in a fluid tight fashion. As seen in FIGS. 1 and 2, the plunger 14 includes a radial fluid passage 14a communicating with the radial openings 13a of the cylinder and an axial bore 14b communicating with the radial fluid passage 14a. As seen in FIG. 1, the leftmost end of the plunger 14 abuts with a cam surface of a drive cam 27, such as an eccentric cam, having a driven connection with a direct current motor (not shown). In accordance with the eccentrically rotational movement of the cam 27, the plunger is axially reciprocated.

As best shown in FIG. 1, a first pressure chamber 28 is defined between the rightmost end of the plunger 14 and the right end portion 16a of the cylinder, while a second pressure chamber 23 is defined between the right side wall of the right end portion 16a and the left side wall of the plug 22. In the first pressure chamber 28, an inlet check ball 30a and a return spring 30b, such as a coil spring, are disposed for acting as an inlet check valve 30 for the outlet port of the axial bore 14b. The inlet check ball 30a is normally biased towards the right end of the plunger for checking the brake fluid flowing through the outlet port of the axial bore 14b with a predetermined setting pressure. Furthermore, an additional return spring 29 is disposed between the inside wall of the right end portion 16a of the cylinder and a stepped right end portion of the plunger, for normally biasing the left end of the plunger 14 to the cam surface of the cam 27. That is, the plunger 14 is normally biased in a direction axially and outwardly projecting from the interior of the cylinder 13.

On the other hand, an outlet check valve 24 is arranged in the second pressure chamber 23. The outlet check valve 24 is constructed by a check ball and a return spring, for checking the brake fluid flowing through the discharge outlet 21 with a predetermined setting pressure.

Figure 3:
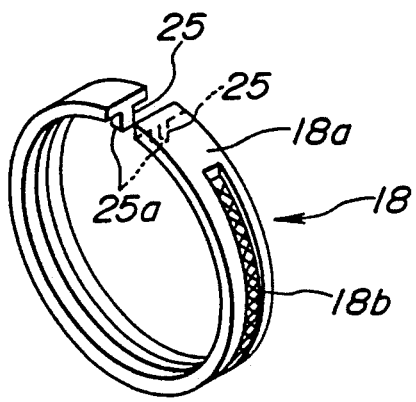
FIG. 3 is a perspective view illustrating a plunger stopper employed in the plunger pump of the embodiment.
Figure 4:
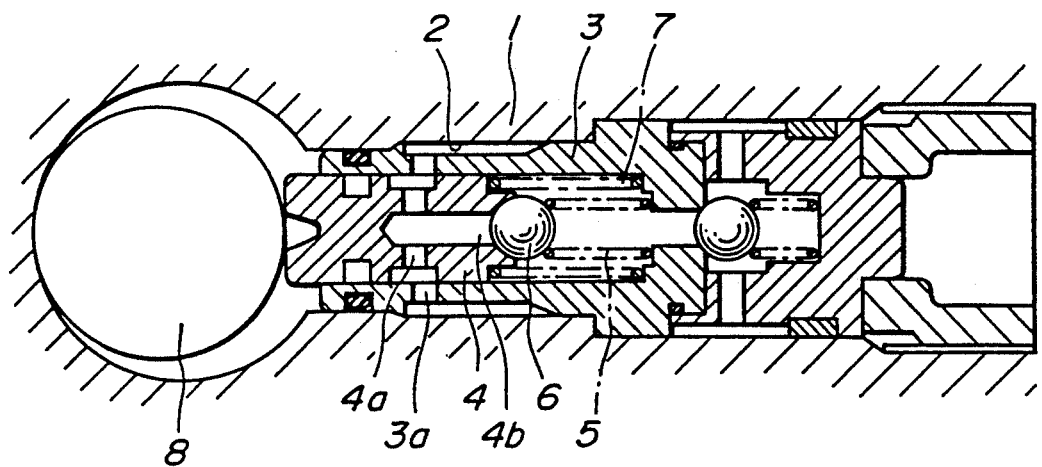
FIG. 4 is a longitudinal cross-sectional view illustrating a prior art plunger pump applied as an ABS pump for an automotive vehicle.

Referring now to FIG. 3, the C-shaped snap ring member 18 comprises an elastic snap ring base portion 18a and a filtering portion 18b arranged in the snap ring portion 18a in a peripheral direction of the snap ring portion. The filtering portion 18b has a narrower width than that of the snap ring base 18a. The thickness of the snap ring base 18a is less than the depth of the support groove 19, such that the outer peripheral surface of the snap ring base 18a is positioned at a lower level than the outer peripheral surface of the cylinder 13 so as to permit a sub-assembly constructed by the cylinder 13, the plunger 14, the snap ring member 18, the return spring 29, and the inlet check valve 30 to be smoothly inserted into the cylindrical hollow 12 of the pump housing 11. As appreciated from FIG. 3, the opposing free ends of the C-shaped snap ring member 18 can be elastically expanded and compressed in a substantially circumferential direction of the snap ring base 18a. That is, the outer diameter of the snap ring member 18 is elastically variable. Thus, the snap ring member 18 is detachably snapped into the support groove 19 of the plunger. As clearly seen in FIG. 3, the snap ring member 18 employed in the plunger pump according to the invention also includes a pair of radially extending stop pawls 25 respectively formed at the opposing ends of the snap ring member 18. The projection amount of the stop pawl 25 radially and inwardly projecting from the inner wall of the snap ring base 18a is set such that the top end 25a of the stop pawl 25 is projected through the associated radial opening 20 bored in the cylindrical portion 15 of the cylinder 13 into the interior of the cylinder, when the snap ring member 18 has been snapped into the support groove 19.

Returning to FIG. 1, the plunger 14 includes an essentially annular groove 31 communicating with the radial fluid passage 14a and engaged with the previously noted stop pawls 25 of the snap ring member 18. The width L of the annular groove 31 is set at a greater dimension than a predetermined stroke of the plunger 14 in order to permit the reciprocating motion of the plunger 14 with the predetermined stroke.

With the above-noted arrangement of the sub-assembly of the plunger pump according to the invention, when the cylinder 13 and the plunger 14 are assembled into the cylindrical hollow 12, the return spring 29, the return spring 30b, and the inlet check ball 30b are first inserted into the internal space of the cylinder 13. Subsequently, the plunger is pushed into the cylinder 13 against a biasing force created by the return springs 29 and 30b. Thereafter, the C-shaped snap ring member 18 is snapped into the annular support groove 19, while pushing the plunger 14 into the cylinder 13. When the C-shaped snap ring member 18 is snapped into the annular support groove 19, the top ends 25a of the stop pawls 25 are fitted through the radial opening 20 into the annular groove 31 of the plunger 14, within a particular retracting range of the plunger relative to the cylinder. In this manner, the stop pawls 25 engage with the annular groove 31. Under these conditions, the plunger 14 is normally biased outwardly of the cylinder due to a spring force caused by the return spring 29. As best seen in FIG. 1, since the stop pawls 25 of the C-shaped snap ring member 18 engages with the groove 31, a maximum projecting amount of the plunger 14 relative to the cylinder 13 is restricted by abutment between a radially extending one side wall 31a of the groove 31 and the top ends 25a of the stop pawls 25. In addition, a maximum retracting amount of the plunger relative to the cylinder is restricted by abutment between the other side wall 31b opposing the side wall 31a and the top ends 25a of the stop pawls. Consequently, through the engagement between the stop pawls 25 and the annular groove 31, the plunger 14 is slidably enclosed in the cylinder 13 within a particular stroke range defined by the above-noted maximum projecting amount and the maximum retracting amount. The maximum projecting amount and maximum retracting amount of the plunger are both determined depending on an eccentric amount of the center axis of the cam 27 with respect to the rotational axis of the cam. Such a construction of the sub-assembly of the plunger pump according to the invention can reliably prevent the plunger 14 and the inlet check ball 30a from falling out of the cylinder 13.

Referring now to FIG. 2, when the sub-assembly having the plunger 14 temporarily mounted in the cylinder 13 through the snap ring 18 is easily inserted into the cylindrical hollow 12. Thus, the sub-assembly is certainly positioned by abutment between the shoulder portion 11a of the pump housing 11 and the flange portion 32 of the cylinder 13. The plug 22 and the outlet check valve 24 are assembled with the sub-assembly. First of all, the plug 22 and the outlet check valve 24 may be mounted on the rear end of a single cylinder part 13 not assembled with the plunger.

The plunger pump assembly according to the invention, is operated as follows.

In accordance with the rotational movement of the cam 27, the plunger is reciprocated with a predetermined stroke. The working fluid is introduced through the radial openings 13a, the radial fluid passage 14a, the axial bore 14b and the inlet check valve 30 into the first pressure chamber 28. According to the retracting movement of the plunger 14, a pressure of the working fluid in the first pressure chamber 28 is increased and reaches at a preset pressure level determined depending on a spring constant of the return spring included in the outlet check valve 24. The pressurized working fluid is fed into the second pressure chamber 23 via the outlet check valve 24 with a pressure above the preset pressure level. Thereafter, the working fluid in the second pressure chamber 23 is discharged from the second pressure chamber through a discharge port (not shown).

As will be appreciated from the above, when a plurality components of the plunger pump are assembled with the pump housing 11, a working efficiency of installation of the sub-assembly on the housing is enhanced, with the result that a manufacturing cost is lowered. Furthermore, since the plunger 14 and cylinder 13 are temporarily interlocked with each other as a unit by means of the stop pawls 25 of the snap ring 18, these parts are easily assembled into the cylindrical hollow 12 even when the hollow 12 is downwardly bored in its vertical direction or when the hollow 12 is horizontally bored in the housing 11. Thus, a high degree of freedom of assembling is obtained.

Moreover, since the filtering portion 18b serving as an oil filter is integrally formed with the stop pawls 25 interlocking the cylinder 13 and the plunger 14, the number of components of the plunger pump is reduced, thereby decreasing the total cost of the plunger pump unit.

In the previously noted preferred embodiment, although the plunger 14 and the cylinder 13 are interlocked with each other by means of the C-shaped snap ring member 18 snapped into the support groove 19 of the cylinder 13 and projected into the annular groove 31 formed on the outer periphery of the plunger, a tang like, elastically operating stopper tab may be attached onto the inner peripheral surface of the cylinder 13, such that the elastic stopper tab engages with the annular groove 31 of the plunger. Alternatively, an elastic stopper tab may be arranged on the outer peripheral surface of the plunger 14 and an engaging groove may be arranged on the inner peripheral surface of the cylinder 13, in such a manner as to engage the engaging groove of the cylinder 13 with the stopper tab of the plunger 14. In both cases, it is necessary to form an additional groove so as to permit the elastic stopper tab to be certainly retracted in the additional groove when inserting the plunger into the cylinder.

Although a support structure for a plunger employed in a plunger pump according to the embodiment is applied for an anti-skid brake control system for automotive vehicles, such a support structure itself may be applied for the other systems employing a plunger pump.

While the foregoing is a description of the preferred embodiments for carrying out the invention, it will be understood that the invention is not limited to particular embodiments shown and described herein, but that various changes and modifications may be made without departing from the scope or spirit of this invention as defined by the following claims.

What is claimed is:

1. A support structure for a plunger employed in a plunger piston, comprising:
   a pump housing;
   a cylinder firmly fitted into a cylindrical hollow defined in said housing;
   a plunger slidably enclosed in said cylinder to provide a pumping action;
   a means to prevent the plunger from falling out of the cylinder during assembly of the cylinder and plunger into said pump housing, said means comprising:
   a stopper arranged on the inner peripheral surface of said cylinder; and
   an engaging portion arranged on the outer peripheral surface of said plunger, for engaging with said stopper and for restricting an axially projecting amount of said plunger relative to said cylinder, while permitting reciprocating motion of said plunger by a predetermined plunger piston stroke.

2. A support structure for a plunger employed in plunger pump, comprising:
   a pump housing;
   a cylinder firmly fitted into a cylindrical hollow defined in said housing;
   a plunger slidably enclosed in said cylinder to provide a pumping action;
   at least one stop pawl retractably arranged on an inner peripheral surface of said cylinder and normally biased to a central axis of said cylinder, said stop pawl being retracted only when said stop pawl is subjected to a force acting radially and outwardly of said cylinder; and
   a groove formed on the outer peripheral surface of said plunger and having a radially extending plane abutting with said stop pawl, for restricting an axially projecting amount of said plunger relative to said cylinder.

3. A support structure for a plunger employed in a plunger pump, comprising:
   a pump housing;
   a cylinder firmly fitted into a cylindrical hollow defined in said housing;
   a plunger slidably enclosed in said cylinder to provide a pumping action;
   a C-shaped snap ring having a radially and inwardly projecting one pair of stop pawls at the opposing free ends thereof;
   said cylinder including a first annular groove receiving said snap ring therein and a radial opening communicating said first annular groove with the interior of said cylinder, said radial opening permitting said stop pawls to be projected into the interior of said cylinder when said snap ring is snapped into said first annular groove; and
   said plunger including a second annular groove on the outer peripheral surface thereof, for interlocking said cylinder and said plunger by engagement between said stop pawls and said second annular groove.

4. A structure for a plunger pump comprising:

a pump housing;

a cylinder firmly fitted into a cylindrical hollow defined in said housing and defining an internal space therein;

a plunger slidably enclosed in the internal space of said cylinder to provide a pumping action, said plunger employing a fluid passage introducing a working fluid therethrough;

a pressure chamber being defined by an innermost end of said plunger inserted into said cylinder and the internal space of said cylinder;

said cylinder including an outlet port communicating with said pressure chamber, for discharging the working fluid pressurized in accordance with a retracting movement of said plunger;

an inlet check valve arranged in said pressure chamber, for preventing back-flow from said first pressure chamber to the fluid passage of said plunger;

an outlet check valve attached to one end of said cylinder, for preventing back-flow from the outlet port of said cylinder to said pressure chamber;

a C-shaped snap ring having a radially and inwardly projecting one pair of stop pawls at the opposing free ends thereof;

said cylinder including a first annular groove receiving said snap ring therein and a radial opening communicating said first annular groove with the interior of said cylinder, said radial opening permitting said stop pawls to be projected into the interior of said cylinder when said snap ring is snapped into said first annular groove; and said plunger including a second annular groove on the outer peripheral surface thereof, for interlocking said cylinder and said plunger by engagement between said stop pawls and said second annular groove and for restricting both an axially projecting amount and an axially retracting amount of said plunger relative to said cylinder.

5. The structure as set forth in claim 4, wherein said C-shaped snap ring employing an oil filter for filtering out impurities in the working fluid introduced into said plunger and said cylinder includes at least one radial opening introducing the working fluid passing through said filter into the fluid passage of said plunger.

* * * * *